(12) United States Patent
Schall et al.

(10) Patent No.: US 8,177,195 B2
(45) Date of Patent: May 15, 2012

(54) CONNECTOR COMPONENTS AND METHODS OF USE

(75) Inventors: Frederick Schall, Brigantine, NJ (US); Christopher Tromley, Penn Valley, PA (US); James Jarozynski, Collingswood, NJ (US)

(73) Assignee: Delair Group, LLC., Delair, NJ (US)

( * ) Notice: Subject to any disclaimer, the term of this patent is extended or adjusted under 35 U.S.C. 154(b) by 193 days.

(21) Appl. No.: 12/642,164

(22) Filed: Dec. 18, 2009

(65) Prior Publication Data

US 2011/0150566 A1    Jun. 23, 2011

(51) Int. Cl.
*B21F 27/00* (2006.01)
*E04H 17/16* (2006.01)
(52) U.S. Cl. .................. 256/22; 256/65.12; 403/397
(58) Field of Classification Search .............. 256/65.02, 256/65.08, 65.11, 65.12; 403/329, 347, 397
See application file for complete search history.

(56) References Cited

U.S. PATENT DOCUMENTS

| | | | | |
|---|---|---|---|---|
| 2,218,953 A * | 10/1940 | Gustafson | ...................... | 256/22 |
| 3,612,461 A * | 10/1971 | Brown | .......................... | 248/317 |
| 4,041,668 A * | 8/1977 | Jahn et al. | .................. | 52/506.09 |
| 5,660,378 A * | 8/1997 | Schall | ........................ | 256/65.12 |
| 5,873,564 A * | 2/1999 | Bisch | ......................... | 256/65.12 |
| 6,375,166 B1 * | 4/2002 | Schall et al. | ............... | 256/65.08 |
| 6,682,056 B1 | 1/2004 | West | | |
| 6,698,726 B2 | 3/2004 | Platt | | |
| 6,752,386 B1 * | 6/2004 | Bundy | ....................... | 256/65.12 |
| 7,021,607 B1 * | 4/2006 | Alexander | ................. | 256/65.11 |
| 7,025,335 B2 * | 4/2006 | Zhu | ................................ | 256/22 |
| 7,134,647 B2 | 11/2006 | Graber | | |
| 7,152,849 B2 | 12/2006 | Graber | | |
| 7,232,114 B2 | 6/2007 | Platt | | |
| 7,341,242 B2 * | 3/2008 | Bertato | ..................... | 256/65.11 |
| 7,347,412 B1 * | 3/2008 | Zhu | ............................... | 256/22 |
| 7,384,025 B2 * | 6/2008 | Lo | .............................. | 256/65.08 |
| 7,819,390 B2 * | 10/2010 | Godwin et al. | ................. | 256/22 |
| 2009/0238640 A1 * | 9/2009 | Godwin et al. | ............... | 403/329 |
| 2010/0078614 A1 | 4/2010 | Graber | | |
| 2012/0032130 A1 | 2/2012 | Graber | | |

\* cited by examiner

*Primary Examiner* — Joshua Kennedy
(74) *Attorney, Agent, or Firm* — Volpe and Koenig, P.C.

(57) ABSTRACT

Interlocking clips are provided to assemble structures without the need for conventional fasteners. Structures such as fences, which may be assembled in situ, include the cooperating clips designed to provide a controlled amount of "play" between the pickets and rails of the fence to enable adjustment when racking the fences to accommodate sloping terrain. The clips are provided to interlock rails to cross members. The clips are preferably formed of a single sheet of a springy metallic material. The clips may be advantageously used to couple other types of apparatus.

3 Claims, 7 Drawing Sheets

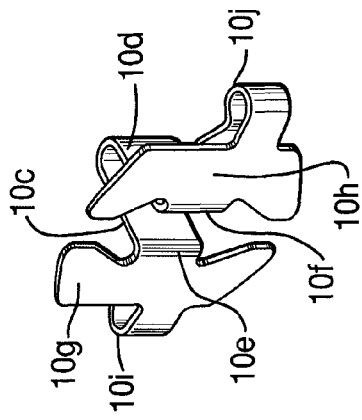
FIG. 1B
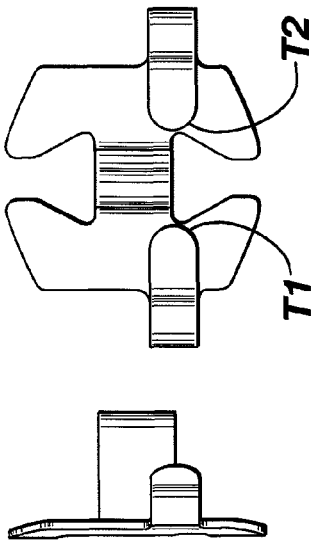
FIG. 1G
FIG. 1F
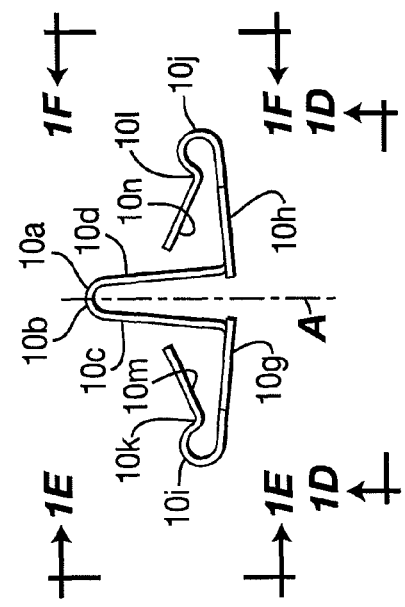
FIG. 1C
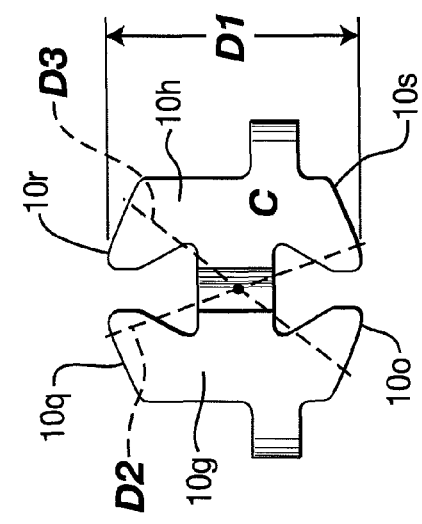
FIG. 1D
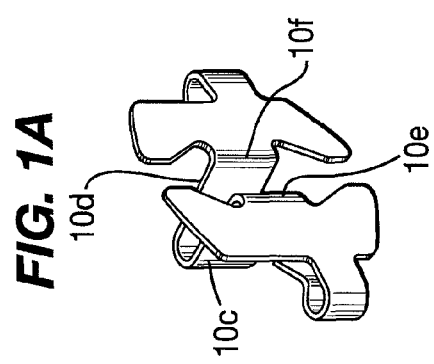
FIG. 1A
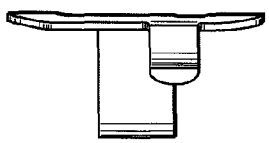
FIG. 1E

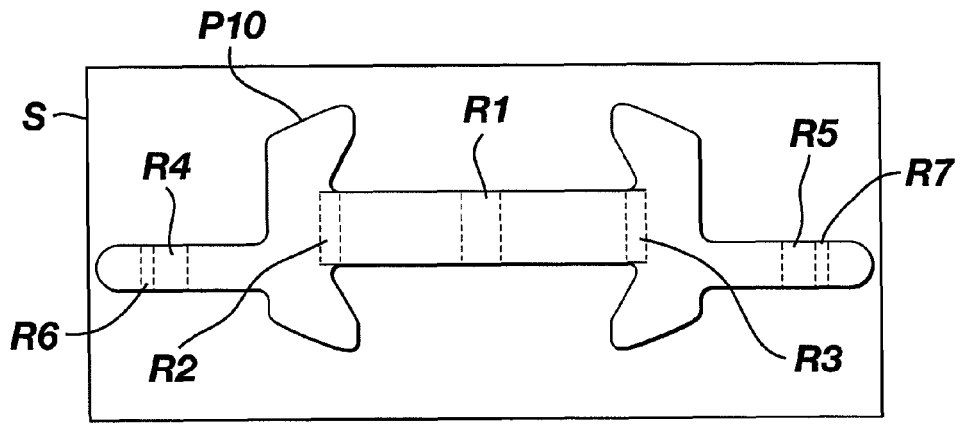
FIG. 1H
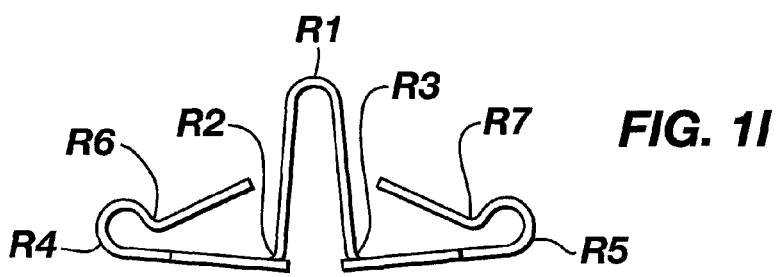
FIG. 1I
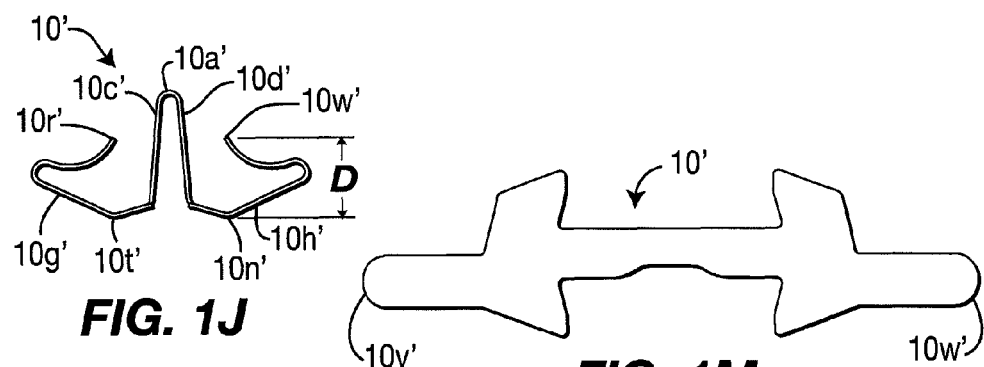
FIG. 1J
FIG. 1M
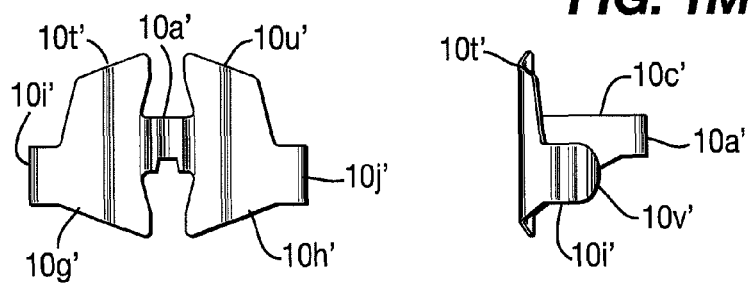
FIG. 1K
FIG. 1L

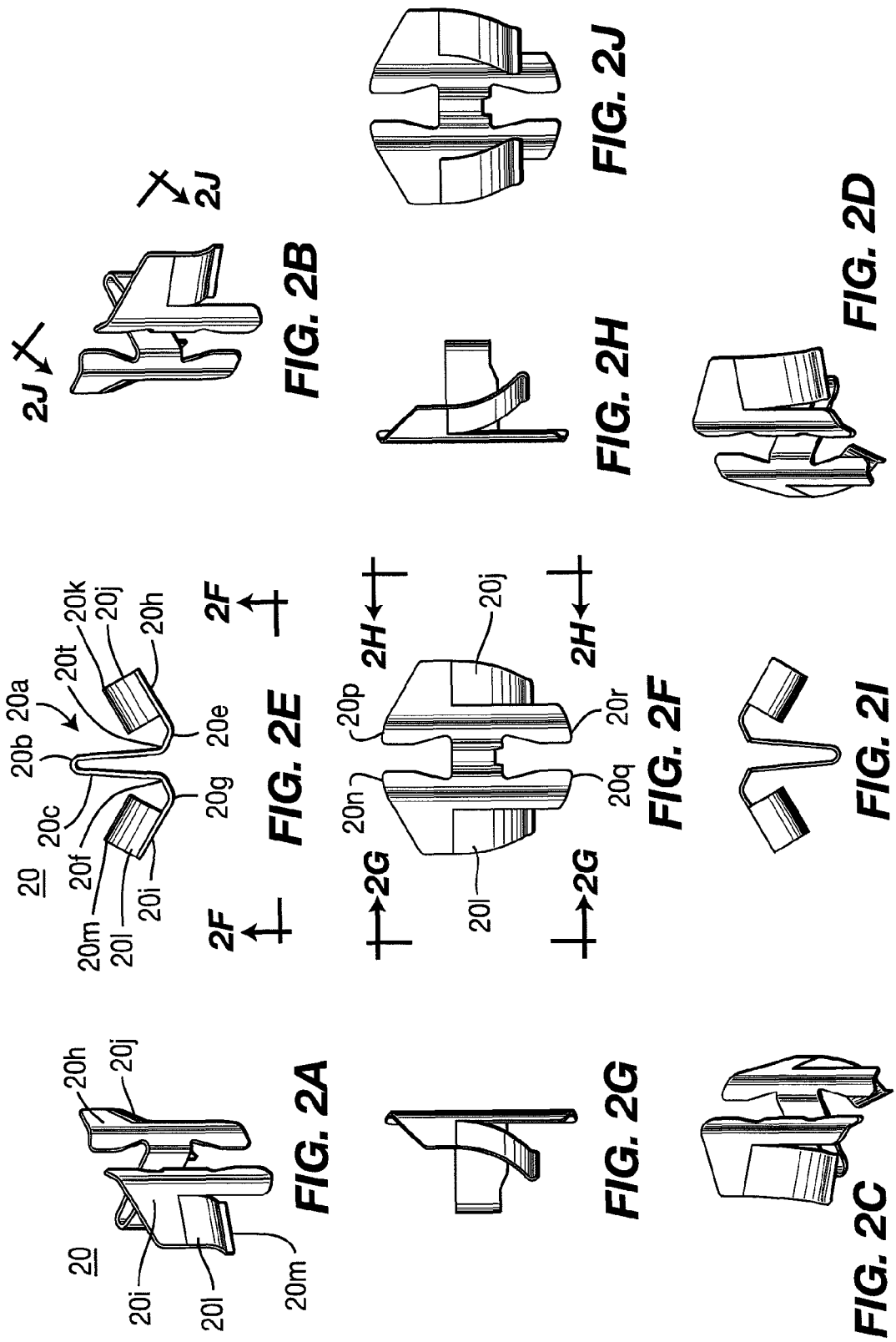

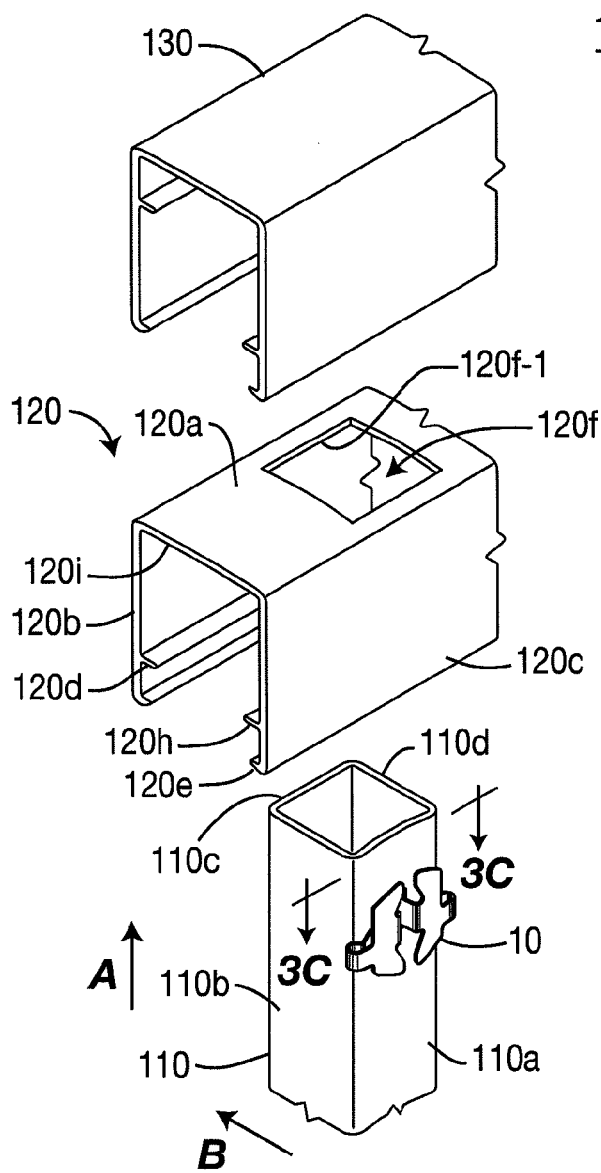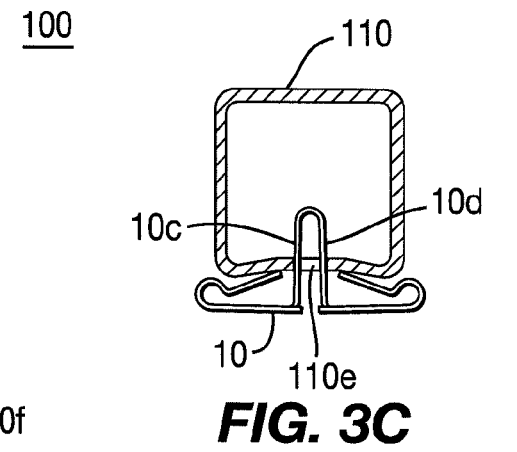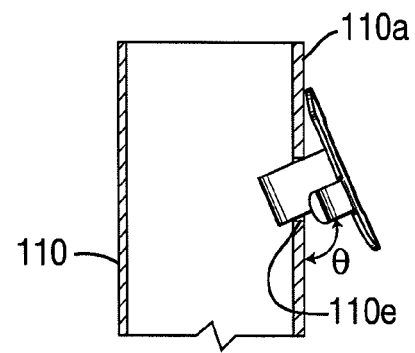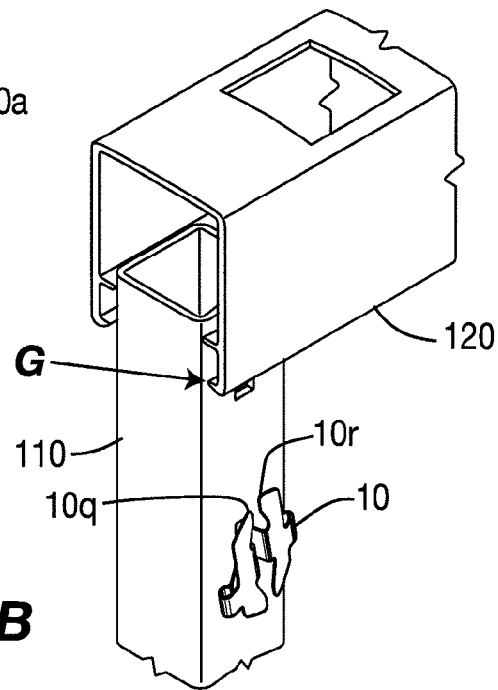
FIG. 3A
FIG. 3B
FIG. 3C
FIG. 3D

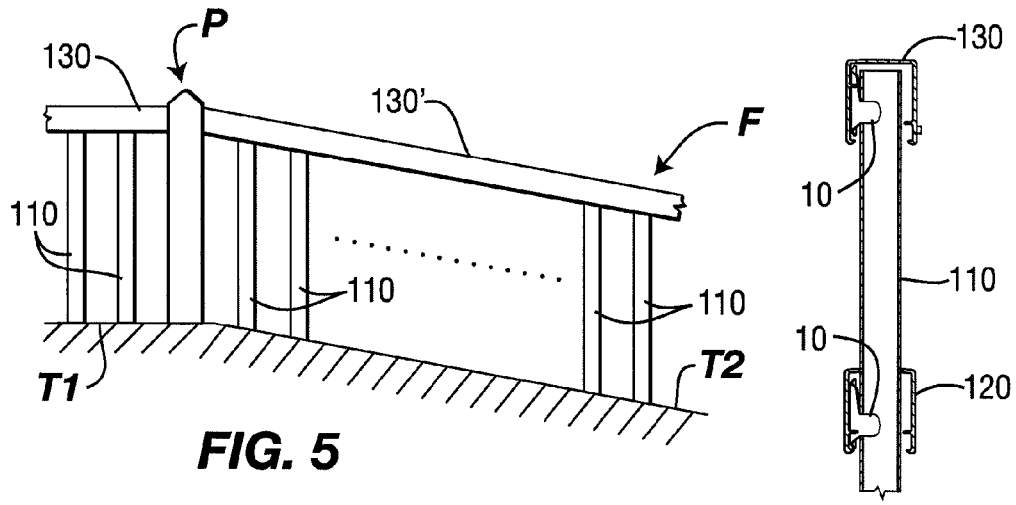
FIG. 5
FIG. 6B
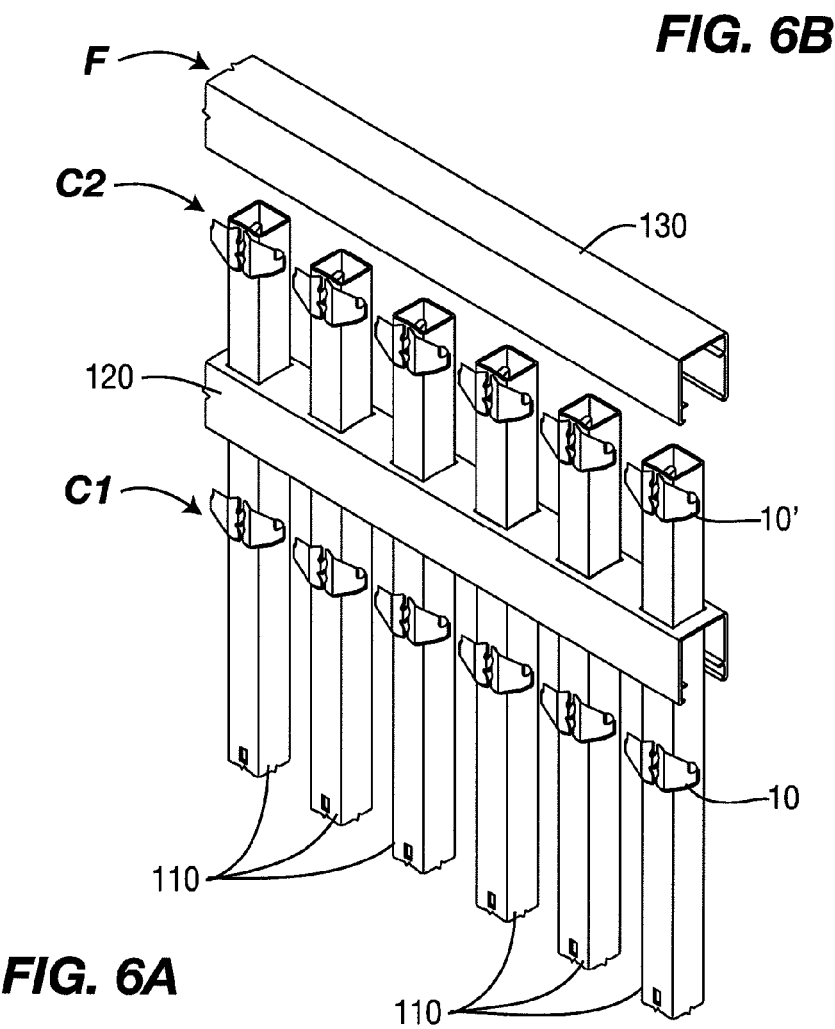
FIG. 6A

CONNECTOR COMPONENTS AND METHODS OF USE

FIELD OF INVENTION

The present invention relates to components for forming assemblies such as interlocked fence structures in situ and more particularly to components configured to interlock to form structures, such as fences assembled in situ and which are configured to interlock without the need for conventional fasteners.

BACKGROUND

Efforts to simplify assembly and in situ installation of fences and the like are well known. In addition to efforts to achieve simplification and ease of assembly of in situ installations, designs have been developed to eliminate the need for conventional fasteners which add to the labor intensive aspects of assembly and installation and further detract from the esthetics of completed fence installations. For example, see U.S. Pat. Nos. 5,660,378, 6,375,166 and DES 573,019.

U.S. Pat. No. 6,375,166, although eliminating the need for conventional fasteners, nevertheless requires tedious and time consuming piercing operations at the installation site. Somewhat similar piercing operations are required in U.S. Pat. No. 5,660,378.

In addition, the embodiments described therein lack the adjustability features necessary during racking of fences in that they lack the ability to provide adjustable positioning of the fence components relative to one another to accommodate a sloping terrain, while at the same time, providing rugged, rattle-free and structurally strong fence assemblies while permitting several degrees of relative movement of the components, while eliminating the need for conventional fasteners.

SUMMARY

It is therefore an object of the embodiments described herein to provide components configured to provide ease of in situ assembly and installation of components which provide a rugged, rattle-free structure without the need for conventional fasteners.

The fence of one embodiment utilizes clips having an insertion portion initially inserted into an opening in a picket and a wing-like portion for engaging a face of the picket adjacent to the opening. The picket, with the clip mounted thereto, and aligned at an angle to the longitudinal axis of the picket, is inserted into a region between opposing sides of a channel-shaped rail so that the top of the picket extends through an opening in the web of the channel-shaped rail. The wing-like portion of each clip has a pair of integral, flexible "wings" extending outwardly on opposite sides of the substantially U-shaped insertion portion that extends into an opening arranged along one surface of the picket. The wings are caused to undergo flexing due to being pressed between the picket and an integral, inwardly directed flange provided art an end of one sidewall of the rail. The wings move partially towards their normal, unflexed state as they pass the aforesaid flange but nevertheless remained flexed due to the limited space between the picket and the interior of the adjacent sidewall of the rail. The clip wings firmly presses the picket against the opposite interior wall of the rail assuring a rugged, rattle-free assembly, providing a superior holding force to lock the three components into place. The interior of the opposite sidewall of the channel-shaped member is preferably provided with a pair of projections which are pressed against the adjacent sidewall of the picket and serve to properly align and orient the picket so as to be substantially parallel to the rail, in cooperation with the aforesaid flexed wings. The integral outer edges of the clip wings are curved to enable relative movement between rail and the picket in a clockwise or counter-clockwise direction about a central axis of the picket opening receiving the clip projecting portion to facilitate alignment of the picket relative to the rail, for example, during racking, to accommodate a sloping terrain.

The opening in the web of the channel-shaped member has a length which is slightly greater than the thickness of the picket measured in the direction of the length of the opening in the web to provide a second range of movement of the picket relative to the rail to provide still further relative movement between these two components to further facilitate their adjustment and alignment, especially during racking.

The clip is preferably made of a suitable springy metal which flexes during insertion into the rail and exerts a strong spring force on the rail, creating a frictional locking force that maintains linear spacing of the picket with respect to the rail, which frictional force may, however, does not impede a racking operation.

Opposite edges of the clip wings are of a length measured in the direction of the longitudinal axis of the picket, which is substantially equal to the distance between a supporting surface of the inwardly directed flange and the interior surface of the web of the rail, trapping the clip between these two surfaces, to prevent disengagement of the rail, clip and picket, and to firmly secure the clip to the picket due to the sides of the U-shaped projection being flexed toward one another, by configuring the distance between the sides of the picket opening to be less than the distance between the sides of the U-shaped projection when unflexed.

In one clip embodiment, the wings bend over on themselves to form a substantially "R" shaped configuration, whereby the free ends of the wings press against the interior surface of the rail, providing the force for locking the picket and rail together.

In another embodiment, the clip, which is also preferably formed of a springy metallic material, is utilized for joining larger size rails and pickets. The central portion of the clip is inserted into an opening in the picket at an angle in a manner similar to the first embodiment. A pair of integral wings are joined to a U-shaped projection at the center of the clip. The wings each have curved end portions bent upwardly in the direction of the projection. The sides of the U-shaped projection are pressed together as the projection is forced into the picket opening. The clip of the second embodiment is likewise oriented at an angle to the longitudinal axis of the picket to clear the integral flange at one end of the adjacent sidewall of the rail. Once clear of the flange, the clip realigns itself with the picket, whereby the bent end portions of the wings press against the interior sidewall of the rail firmly locking the picket and rail to one another. Similar to the first embodiment, the distance between the outermost opposite edges of the integral curved wings is substantially equal to the distance between the inwardly directed integral flange of the rail and the interior surface of the yoke, serving as a positive stop to lock the clip into the rail. The outwardly bent portions of the wings partially snap back toward their normal unflexed state as they pass the flange on the rail. The clip firmly secures the picket to the rail. The sides of the projection portion of the clip configured for insertion into an opening in the picket are bent to substantially form a V-shape. The vertexes of the V-shaped projection extends into the interior of the opening in the picket to aid in retaining the clip in place in the picket.

In still another clip embodiment, the wings are joined to the V-shaped portion configured for insertion into an opening in a picket. Inner ends of the wings are integrally joined to the V-shaped projection portion and extend downwardly and away from the V-shaped projection, each forming a first V-shaped bend forming an angle of greater than 90 degrees with the adjacent side of the V-shaped projection portion. The inner ends are bent a spaced distance away from the first V-shaped bend to form a second V-shaped configuration having a vertex which is a given distance below the vertex of the first V-shaped bend. The outer ends of the wings are bent to form a curve about midway over their length and each define an outer section which extends over its associated inner end and curves upwardly and away from its associated inner end. The distance between the tips of the outer ends of the wings and the vertex at the second V-shaped configuration is chosen to accommodate picket and rail designs which create larger gap spaces between a sidewall of the picket and the interior surface of an adjacent sidewall in the rail. In order to accommodate a given gap space created by the pickets and rails used in a given installation, the angle of the first V-shaped bend may be made larger and/or the length of the curved outer ends of the wings may be increased to increase the distance between the vertex of the second V-shaped bend and tip of the adjacent outer end of the wing.

Although the above embodiments set forth applications for picket fences, other applications such as ladders and other structural members may utilize the design of the aforesaid embodiment to great advantage.

The embodiments described above are preferably formed from a single sheet of a springy metallic material, which is cut, machined or otherwise stamped from the sheet and then bent to form the yieldable central, U-shaped projection having a pair of outwardly extending yieldable wings. The springy material is chosen to provide a superior spring force which is able to retain the picket, rail and clip locked together. As an alternative, the clips of any of the embodiments herein may be produced by molding them from a suitable plastic/resin. The assembly can be performed with ease and eliminates the need for conventional fasteners.

BRIEF DESCRIPTION OF THE DRAWINGS

Various embodiments and objectives of the present invention will be best understood from a consideration of the detailed description and drawings in which:

FIGS. 1A and 1B are perspective views of one embodiment of the present invention viewed from two different angles.

FIG. 1C is a top view of the clip in FIG. 1A.

FIG. 1D is a view of the clip of FIGS. 1A and 1B looking in the direction of arrows 1D-1D in FIG. 1C.

FIG. 1E is a view of the clip of FIGS. 1A and 1B looking in the direction of arrows 1E-1E in FIG. 1C.

FIG. 1F is a view of the clip of FIGS. 1A and 1B looking in the direction of arrows 1F-1F in FIG. 1C.

FIG. 1G is a view of the clip of FIGS. 1A and 1B looking in the direction of arrows 1G-1G in FIG. 1C.

FIGS. 1H and 1I are plan views showing the manner in which the clip in FIG. 1A is produced.

FIGS. 1J, 1K and 1L respectively are front elevational, bottom and left-side elevational views of a clip which is a modified version of the clip of FIGS. 1A-1I.

FIG. 1M is a plan view showing the clip of FIGS. 1J-1L before being formed into its final configuration.

FIGS. 2A-2D are perspective views showing another embodiment of the clip of the present invention viewed from various angles.

FIG. 2E is a top view of the clip of FIG. 2A.

FIG. 2F is a view of the embodiment of FIGS. 2A-2D looking in the direction of arrows 2F-2F in FIG. 2E.

FIG. 2G is a left-side view of the clip of FIGS. 2A-2D looking in the direction of arrows 2G-2G of FIG. 2F.

FIG. 2H is a right-hand view of the clip of FIGS. 2A-2D looking in the direction of arrows 2H-2H in FIG. 2F.

FIG. 2I is a bottom view of the clip of FIGS. 2A-2D.

FIG. 2J is a view of the clip of FIGS. 2A-2D looking in the direction of arrows 2J-2J of FIG. 2B.

FIGS. 3A and 3B are exploded perspective views showing the manner in which a picket is assembled to a rail employing the clip embodiment of FIG. 1A.

FIG. 3C is a sectional view of the assembly of FIG. 3A looking in the direction of arrows 3C-3C.

FIG. 3D is a sectional view of the assembly of FIG. 3A looking in the direction of arrows 3D-3D.

FIG. 5 is a plan view showing a fence installation of the present invention on a sloping terrain to facilitate an understanding of "racking".

FIG. 6A is an exploded perspective view of a fence showing the manner in which multiple clips and rails are mounted to pickets.

FIG. 6B is a sectional view of the fence of FIG. 6A taken through one of the pickets.

DETAILED DESCRIPTION OF THE PREFERRED EMBODIMENTS

Figure 2K:
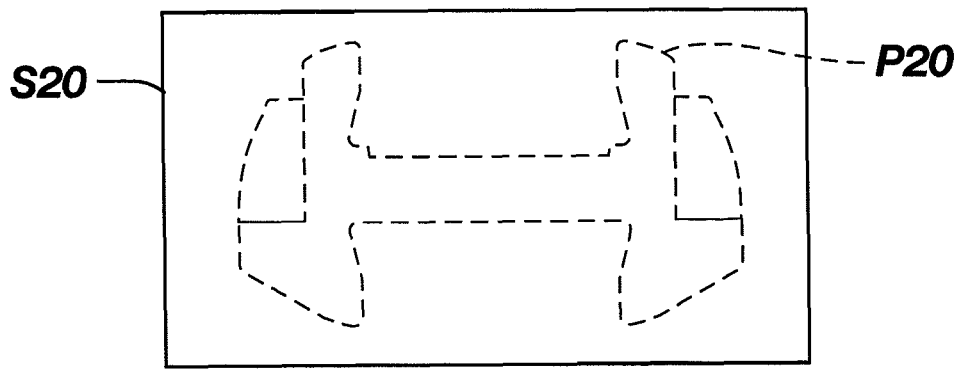
FIGS. 2K, 2L, 2M and 2N are plan views showing the manner in which the clip of FIG. 2H is produced.

FIGS. 1A-1G show the first clip embodiment 10, which is preferably cut or stamped out of a single sheet of a metallic material having the requisite flexibility and springiness which is, for example, stainless steel. The clip is then bent so that the central portion 10a of clip 10 has a substantially U-shaped configuration defined by curved portion 10b and sides 10c and 10d integrally joined to curved portion 10b. The free ends of the sides 10c and 10d are respectively bent outwardly and away from the central axis A to provide a pair of wings 10g and 10h extending outwardly away from one another. Wings 10g and 10h are then bent at 10i and 10j to form smoothly curved portions 10i and 10j, the wings 10g and 10h being further bent at 10k and 10l providing free ends 10m and 10n which, in FIG. 1C can be seen to form an acute angle with the main wing portions 10g and 10h.

The curved portions 10q-10p of main wing portion 10g and the curved portions 10r and 10s of main wing portion 10h are equidistant from an imaginary center C so that the distance measured along an imaginary diameter is substantially constant and equal to a distance D1, which design feature will be best understood in consideration of the assembled components, i.e., the assembled picket, rail and cooperating clip, as described below.

As was set forth above, the springy metallic clip 10 has the capability of flexing due to the application of force and of returning to its unflexed state upon removal of such force. For example, sides 10c and 10d of the curved portion 10a of clip 10 are designed and configured to flex and move towards one another upon the application of an appropriate force. Similarly, free ends 10m and 10n will flex and thereby move toward main wing portions 10g and 10h upon the application of an appropriate force and will likewise return to their relaxed state upon the removal of the said force.

In one preferred method for producing clips 10, a clip pattern P10 is stamped or otherwise cut from a flat sheet S10 of a springy metallic material, such as stainless steel, as shown in FIG. 1H, to provide the planar clip P10. The planar clip P10 is then bent around suitable forming tools to form the desired curvatures at regions R1-R6, the related curvatures resulting from the bending operations being shown in FIG. 1I.

FIGS. 1J, 1K and 1L show a clip embodiment 10' which is a modification of clip 10, like portions of clip 10 and clip 10' being identified by like numerals except that portions in FIGS. 1J-1L are identified with primes. The angle Ω' formed between clip portions 10c'-10g' and 10d'-10h' are greater than the angle Ω' formed between clip portions 10c-10g and 10d-10h of clip 10. The wings of clip 10' are bent to provide vertices 10t'-10u' and the outer ends 10k'-10l' are curved upwardly from curved portions 10i'-10j' of clip 10'. It can be seen from a comparison of clips 10 and 10' that the distance D measured from the vertices 10t'-10u' to their associated free ends 10v-10w is greater than the distances measured from the free ends of the portions 10k-10l to the portions 10g-10h of clip 10, enabling the employment of clip 10' in installations using pickets and rails that create a larger gap space in the region which receives the clip. The distance D can be adjusted by adjusting one or more of: the angle Ω'; the length of clip portions 10k'-10l' and the location of vertices along clip portions 10g'-10h'.

The clip embodiment 10' may be manufactured in a manner similar to the clips 10 and 20. FIG. 1M shows the clip 10' after it has been stamped or cut out of a flat sheet of springy metallic material. The clip is then bent into the proper shape as shown in FIGS. 1J-1L employing suitable forming tools.

FIG. 3A is an exploded perspective view of the clip of FIGS. 1A-1G showing the manner in which the clip mounts between a rail and a picket. The exploded assembly 100 comprises a channel-shaped mid-rail 120 having a web portion 120a and two (2) integral sidewalls 120b, 120c. Sidewall 120b has an integral alignment rib 120d extending along the length of sidewall 120b. Sidewall 120c has an integral, inwardly directed flange 120e along the bottom free end of sidewall 120c. An opening 120f is provided in web portion 120a of rail 120, which conforms to the rectangular, cross-sectional shape of the picket (preferably although not necessarily rectangular).

Picket 110 is a hollow, rectangular-shaped, elongated member defined by four (4) sidewalls 110a, 110b, 110c and 110d. Sidewall 110a is provided with an opening 110e for receiving the substantially U-shaped projection 10a of clip 10. The dimensional relationship of opening 110e relative to the substantially U-shaped projection 10a is such that the curved tip is substantially free to enter opening 110e and, as the U-shaped projection 10a is pressed into the opening, the gradually increased spacing between sides 10c and 10d in the unstressed state becomes greater than the width of opening 110e in the horizontal direction, causing the sides 10c and 10d of the flexible clip to be pressed toward one another and undergo flexing.

Clip 10, after being at least partially inserted into opening 110e, is oriented at an angle θ to surface 110a of picket 110 as shown in FIGS. 3B and 3D. Clip 10 is oriented at an angle θ to bring the upward edges 10q, 10r into engagement with surface 110a of picket 110.

The upper end of picket 110 is placed between sidewalls 120b, 120c of central rail 120 and moved upwardly in the direction shown by arrow A so that the upper end of picket 120 enters into opening 120f and moves further in the direction A relative to the rail 120. It should be understood that the picket may be held stationary and the rail moved downwardly relative to the picket or both picket and rail may be moved during this assembly. There is sufficient clearance between picket surface 110a and the free end of flange 120e to move the tips 10q, 10r of clip 10 into the gap region G to enable the clip to be moved upward together with picket 110. Before the picket 110 enters into gap G, the tips T1, T2 of the free ends 10m, 10n of clip 10 (Note, also FIG. 1G) rest against surface 110a of picket 110 and are substantially in the relaxed, i.e., unflexed, state. As clip 10 moves upwardly and tips 10q, 10r enter into gap G, flange 120e slidingly engages the clip causing the bottom end of clip 10 to move toward surface 110a of picket 110, the top edges 10q, 10r serving as a pivot about which clip 10 rotates. This action moves the U-shaped portion 10a of clip 10 more deeply into the opening 110e, causing clip sidewalls 10c, 10d (Note, especially FIGS. 1C and 3C) to move toward one another and further causing the portions 10m, 10n of clip 10 to flex in the direction of portions 10g, 10h respectively, of clip 10. During this time clip 10 urges picket 110 to move in the horizontal, left-hand direction as shown by arrow B to urge surface 110c of picket 110 against alignment rib 120d of rail 120. The angle θ between clip 10 and picket 110 continues to be reduced toward zero degrees as the clip 10 moves further into the interior of rail 120 until the lower edges 10p, 10s (Note, also FIG. 1D) clear flange 120e, whereupon the clip 10, due to the spring forces of the U-shaped portion 10a and portions 10m, 10n, urge portions 10g, 10h of clip 10 against the interior surface 120g of sidewall 120b (see FIG. 3C).

The distance between the opposing edges 10q, 10s and 10r, 10p is substantially equal to the distance between flange 120e and the interior surface 120i of web portion 120a of rail 120 thereby confining clip 10 between flange 120e and the interior surface 120i, preventing the clip 10 and picket 110 from moving upwardly or downwardly relative to rail 120. The spring force of clip 10 urges picket 110 away from sidewall 120c and against the alignment rib 120d and the edge 120f-1 of opening 120f to maintain the picket in parallel with sidewall 120b and further to prevent movement of picket 110 either leftwardly or rightwardly in the horizontal direction relative to rail 120. The springy material of which the clip is formed is chosen to provide a spring force which is more than adequate to achieve the above objectives.

As can clearly be seen, rail 120 completely conceals clip 10 from view, when fully assembled.

The top rail 130 is mounted to the picket 110 using a clip 10 in a similar fashion to that shown in FIGS. 3A and 3B, the difference being that the top end of the picket is retained within the top rail 130.

Making reference to FIGS. 2A-2J, the more rugged clip embodiment 20 shown therein is comprised of a substantially U-shaped portion 20a having a curved central portion 20b and integral arms 20c, 20d. Clip 20 is bent to form corners 20f, 20t and 20g, 20e. The outward portions 20i, 20a extending from corners 20g, 20e respectively are further bent to form curved portions 20l, 20j which terminate in end portions 20m, 20k respectively.

In the manner similar to the clip embodiment 10, clip embodiment 20 which is likewise formed of a suitable springy material, is configured to have its sidewall portions 20c, 20d flexed inwardly as it is pressed into the opening 120c' have its portions 20i, 20a curve portions 20l, 20j are likewise to be flexed from the relaxed position to provide a holding force suitable to retain the picket within the rail to which it is inserted in the manner similar to clip 10 and thereby provide assembly in which picket 120' is locked to rail 110' in a rugged and rattle free manner.

Both of the clip embodiments 10 and 20 are further capable of yielding to permit raking of the fence which is described below with reference to FIG. 5.

Figure 2N:
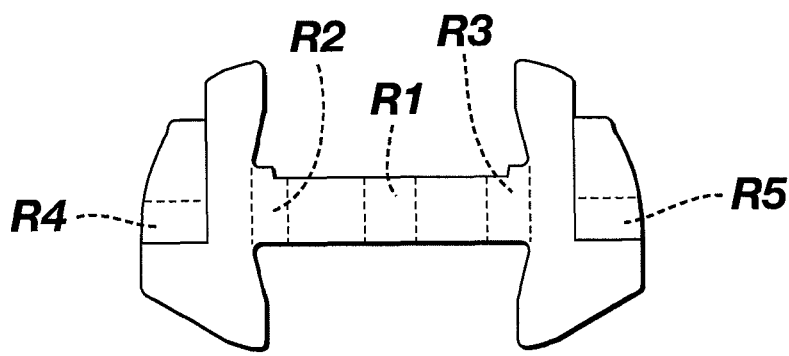
Figures 2L, 2M:
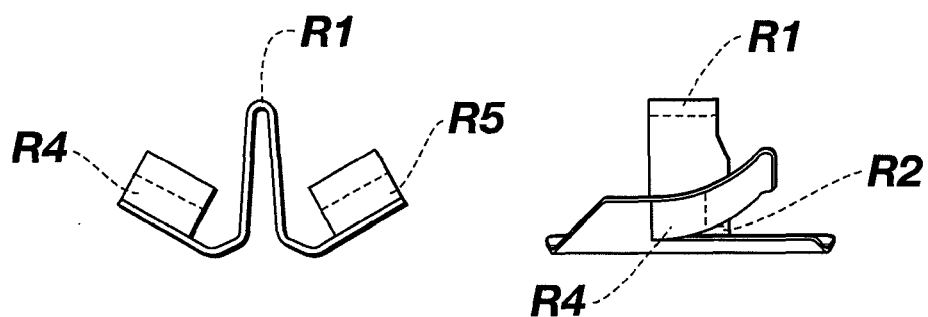

FIGS. 2K-2M show a preferred method for producing clip 20. Similar to the description of FIGS. 2H-2I, a clip pattern P20 is stamped out of sheet S20 of a springy metallic material. The planar clip P20 is bent around suitable forming tools to form the desired curvatures at regions R1-R5, the resulting curvatures being shown in FIGS. 2L-2M.

Figure 4:
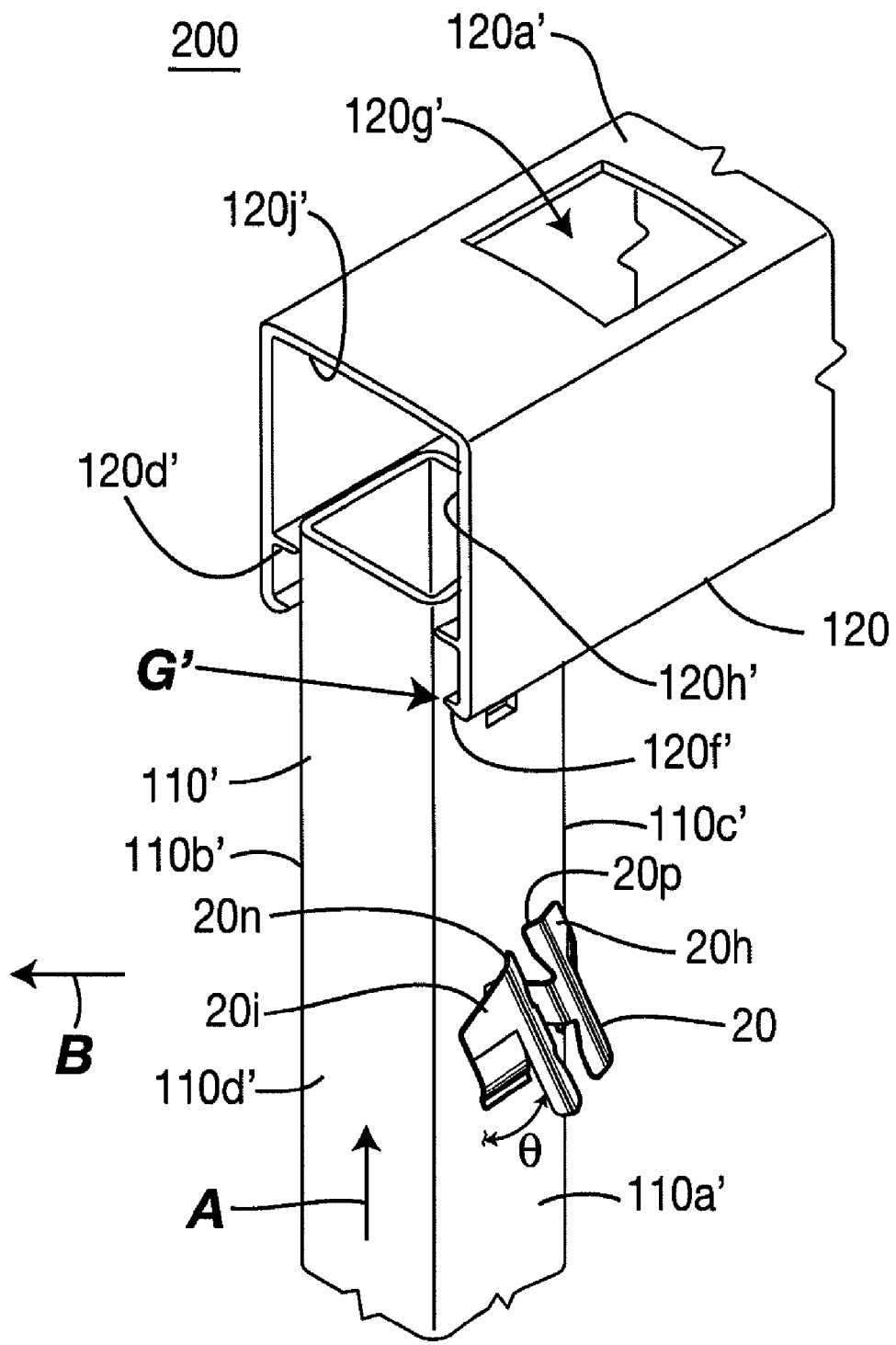
FIG. 4 is an exploded perspective view showing the manner in which a picket is assembled to a rail employing the clip embodiment of FIG. 2A.

Making reference to FIG. 4, there is shown an assembly 200, comprised of a rail 120' and a picket 110' which are substantially similar to the assembly 100 of FIGS. 3A and 3B but of a larger size and adapted for heavy duty use such as industrial or commercial applications. As a result, the rail and picket are identified with prime numbers to differentiate them from the rail 110 and picket 120 and 120 as shown in FIGS. 3A and 3B.

The heavy-duty clip embodiment 20 shown in FIG. 4 has its substantially U-shaped projection 20a inserted into opening 110e' and aligned at an angle to the picket in a manner substantially similar to that shown in FIG. 3A, wherein clip 20 is aligned so that its longitudinal axis forms an angle θ with surface 110a' of picket 110'. As was described above regarding assembly 100, as shown in FIGS. 3A and 3B, opening 110e is of a size relative to clip 20 so that the sidewalls of U-shaped portion 20d are flexed and moved toward one another as the substantially U-shaped projection 20a is inserted more deeply into opening 110e'.

Clip 20 is oriented at an angle θ to surface 110a' of picket 110' so that the upper most edges 20n, 20p of clip 20 (see also FIG. 2F) engage surface 110a' of picket 110' and further so that the bent free ends 20m, 20k also engage the surface 110a'.

Similar to the embodiment shown in FIGS. 3A and 3B, the edges 20n, 20p easily enter the gap region G' between the outer most edge of flange 120e' and surface 110a' as the picket 120' is moved upwardly between sidewalls 120b' and 120c' of rail 120'. The top end of picket 110' passes through opening 120f' and clip 20 changes its orientation relative to surface 110a' whereby the lower end of clip 20 swings towards surface 110a', with edges 20n, 20p serving as pivots about which clip 20 rotates.

As the picket moves more deeply into the region between sidewalls 120b' and 120c' and has its top end extending through opening 120f', curved portions 20l, 20j are caused to flex so that the tips 20m, 20k move in a direction toward the lower ends 20q, 20r of clip 20. When the lower tips 20q, 204 clear flange 120e', clip 20 snaps into position so that its outside corners 20g, 20e are in intimate engagement with the interior surface 120g' of sidewall 12c' and, similar to the embodiment 100 shown in FIGS. 3A and 3B, surface 110c' of picket 110' is in intimate engagement with alignment rib 120d' and edge 120f-1' of opening 120f', portions 20l, 20j serving to press surface 110c' of picket 110 into firm engagement with rib 120d' and edge 120f-1', 110e' which also serves to press the vertices 20q, 20r into intimate engagement with the interior surface 120g' of the rail sidewall 120c'.

The distance between upper tips 20n, 20p and the lower tips 20q, 20r is substantially equal to the distance between flange 120e' and the interior surface 120i' of web portion 120a', causing the entire length of the outside corners 20g, 20e to rest against the interior surface 120g' of rail sidewall 120c' and further assuring that clip 20 is locked in place between interior surface 120g' and flange 120e' and that the picket 110' is maintained substantially parallel to the sidewall 120b' of rail 120'. The clip embodiment 20 has all of the advantageous features of the clip embodiment 10 with the understanding that the clip embodiment 20 is a more rugged, heavy-duty version which is obtained by virtue of its different configuration as compared with clip embodiment 10. If desired, clips 20 may be formed of a thicker metallic sheet or be formed of a metallic material providing an increased spring force, or both.

FIG. 5 is a view of a portion of a fence employing the clips of the embodiment shown in FIG. 1A, the fence being installed to extend along a level terrain T1 and an adjacent sloping terrain T2. Adjacent ends of the rails 130, 130' are joined to a post P at the location where the level and sloping terrains meet. Although the pickets 110 are maintained in a vertical orientation along both the level and sloping terrains, the rails 130, 130' are arranged so as to be substantially parallel to their respective terrains. Nevertheless, the clips 10 are maintained so that their central axes are aligned with the longitudinal axes of their associated pickets 110, the rail 130' is oriented so that it deviates from being perpendicular to the central axes of the pickets and the clips, which type of installation is referred to as "racking." By providing the top and bottom edges of the clips with a convex curvature, making reference to FIG. 1D, the distance measured along imaginary diameters such as D2 and D3, for example, is constant and equal to D1, which is substantially the same as the distance between the flange 120e and the interior surface of the web portion 120a, to firmly lock the rails to the pickets and further to prevent rattling of the fence, even when mounted on a sloping terrain.

The clip embodiment 20 of FIG. 2 is provided with similarly curved top and bottom edges to permit racking as well as assuring that the rails are firmly locked to the pickets and to provide a rattle-free fence.

FIG. 6A is a perspective view showing a partial fence assembly employing the clips 10, each picket 110 receiving two (2) clips to accommodate a mid-fence rail 120 substantially the same as shown in FIG. 3A, and a top rail 130 also shown in FIG. 3A. Rectangular slots 110e are formed in the pickets (see FIG. 3A). The array C1 of clips 10 for retaining the mid-fence rail 120 are first mounted on the pickets in the tilted manner described above regarding FIGS. 3A and 3B, after which rail 120 is moved downwardly to receive the pickets through openings 120f and then to receive and cover the array C1 of clips 10 for retaining rail 120 to pickets 110. The array C2 of clips 10 for retaining the top rail 130 are then inserted in pickets 110 provided closer to the upper ends of the pickets 110. The top rail 130 is slid downwardly over the top of the pickets 120 to lock the clips 10 in array C2 into place. All of the clips in arrays C1 and C2 are locked into place in the manner shown in the sectional view of FIG. 6B.

What is claimed is:

1. Apparatus comprising:
  a channel-shaped member having a web portion and a pair of integral sidewalls extending from the web portion;
  said web portion having at least one opening;
  a cross member inserted between said sidewalls and having a first end extending at least partially through said opening, longitudinal axes of said cross member and said channel-shaped member being transverse to one another;
  a stabilizing rib integral with and extending inwardly from said first sidewall and engaging a first surface of said cross member;
  a flange integral with and extending inwardly from a free end of said second sidewall;
  a clip having a substantially U-shaped central portion defined by first and second sidewalls joined to a curved end portion, said central portion extending inwardly into an opening in a second surface of said cross member opposite said first surface, the first and second sidewalls of said U-shaped central portion being urged toward one another as the U-shaped central portion is pressed into said opening;

free ends of said U-shaped central portion first and second sidewalls being bent a given distance from the curved end portion to form a pair of wing portions extending away from one another and being provided with curved bends to form free ends which extend toward the curved central portion, the free ends forming an angle of less than 90° with the wing portions;

said free ends being urged into intimate contact with the second surface of said cross member and said wing portions being urged into intimate contact with an interior surface of said second sidewall whereby said clip urges a first surface of said cross member into intimate contact with the stabilizing rib and an edge of the opening in the rail thereby maintaining the channel-shaped member, cross member and clip into intimate locking engagement.

2. The apparatus of claim 1, wherein a distance of opposing edges of said first and second wing portions are substantially equal to a distance between the integral flange of the second sidewall of said channel-shaped member and an interior surface of said web to retain the clip in the channel-shaped member.

3. The apparatus of claim 1, wherein opposite edges of said first and second wing portions are curved and the distance measured along a diameter passing through a central point of the clip is substantially equal to a distance between the flange on the second sidewall of the channel-shaped member and an interior surface of the web portion of the channel-shaped member to retain the clip in place even in the event that a longitudinal axis of the channel-shaped member deviates from being perpendicular to axis of the clip.

* * * * *